US006027263A

United States Patent [19]

Tawa

[11] Patent Number: 6,027,263

[45] Date of Patent: Feb. 22, 2000

[54] COVERING AN AREA IN PRINTED PHOTOGRAPH

[76] Inventor: Roger E. Tawa, 45 Olde Field Rd., Newton, Mass. 02459

[21] Appl. No.: 09/172,352

[22] Filed: Oct. 14, 1998

[51] Int. Cl.[7] .................................................... G03B 17/24

[52] U.S. Cl. ............................................ 396/655; 396/661

[58] Field of Search ..................................... 396/655, 661

[56] References Cited

U.S. PATENT DOCUMENTS

| | | | |
|---|---|---|---|
| 3,942,621 | 3/1976 | Karlan | 197/181 |
| 5,130,789 | 7/1992 | Dobbs et al. | 358/75 |
| 5,153,632 | 10/1992 | Maida et al. | 354/415 |
| 5,266,381 | 11/1993 | Simon | 428/195 |

*Primary Examiner*—David M. Gray
*Attorney, Agent, or Firm*—Fish & Richardson P.C.

[57] ABSTRACT

A sheet, having material deposited thereon, is placed over a printed photograph and the material is then transferred onto the printed photograph to cover a selected area in the printed photograph. The sheet has rub-on material deposited thereon, where the rub-on material is shaped and sized on the sheet for covering an image of a pupil of a person such a red-eye affected image of a pupil.

9 Claims, 6 Drawing Sheets

COVERING AN AREA IN PRINTED PHOTOGRAPH

BACKGROUND

The "red eye" effect in photographic images occurs when a person is photographed with a flash in a low light environment. Under such conditions, the person's pupil becomes dilated, allowing the bright light of the flash to penetrate the pupil. The photographic image of the eye can then include the image of the actual retina of the person. Since the retina is red, the image of the retina in a photographic image appears as a red area defined by the pupil and is referred to as 'red-eye" effect.

One method of correcting for red-eye effect in photographs is to use specialized pens to paint over the red-eye affected pupil image with dark ink. The ink is typically permanent. Another method of correcting for red-eye effect in photographs is to scan the image into a computer and recolor the red-eye affected image using a photo editing software.

SUMMARY

In one aspect, the invention features placing a sheet having material deposited thereon over a printed photograph and transferring the material onto the printed photograph to cover a selected area in the printed photograph.

Preferred embodiments of the invention may include one or more of the following features.

The selected area is an image of a pupil forming part of an image of an eye. The pupil image has red-eye effect.

The material is shaped and sized on the sheet to form a selected shape of a selected size for covering the pupil image, such as a substantially circular shape. The material can be shaped on said sheet to form a plurality of shapes, where the shapes are sized to have at least two different sizes. The greatest dimension of each of the shapes is substantially within a range of dimensions from about 0.25 millimeters to about 5 millimeters. The greatest dimension of each of the shapes can further range from about 0.5 millimeters to about 2 millimeters.

The sheet is transparent. The transparent sheet is moved over the photograph to substantially align the shaped and sized material with the image of the pupil in the printed photograph. The material is then transferred by applying pressure to the material to transfer the shaped and sized material onto the pupil image to substantially cover the pupil image.

The material is selected to be removable. The material can then be removed by placing an adhesive material over the transferred material to adhere to the transferred material and then removing the adhesive material.

In another aspect, the invention features a sheet having rub-on material deposited thereon, where the rub-on material is shaped and sized on the sheet to form a plurality of shapes, the greatest dimensions of each shape being substantially within a range of dimensions from about 0.25 millimeters to about 5 millimeters.

Preferred embodiments of the invention may include one or more of the following features.

One of the shapes is substantially a circle. The greatest dimension of each shape is substantially within a range of dimensions from about 0.5 millimeters to about 2 millimeters.

Advantages of the invention may include one or more of the following advantages.

In some embodiments, the integrity of the original print is preserved and minimal damage, if any at all, is done to the emulsion. Additionally, in some embodiments, the deposited material is removable. Therefore, if mistakes are made, the transferred material can be removed and the method may be repeated to cover the selected area.

Additionally, deposited material can be selected to reduce, if not eliminate, fading, smudging, or staining.

Other features and advantages of the invention will become apparent from the following description of preferred embodiments, including the drawings, and from the claims.

DESCRIPTION

Figure 1:
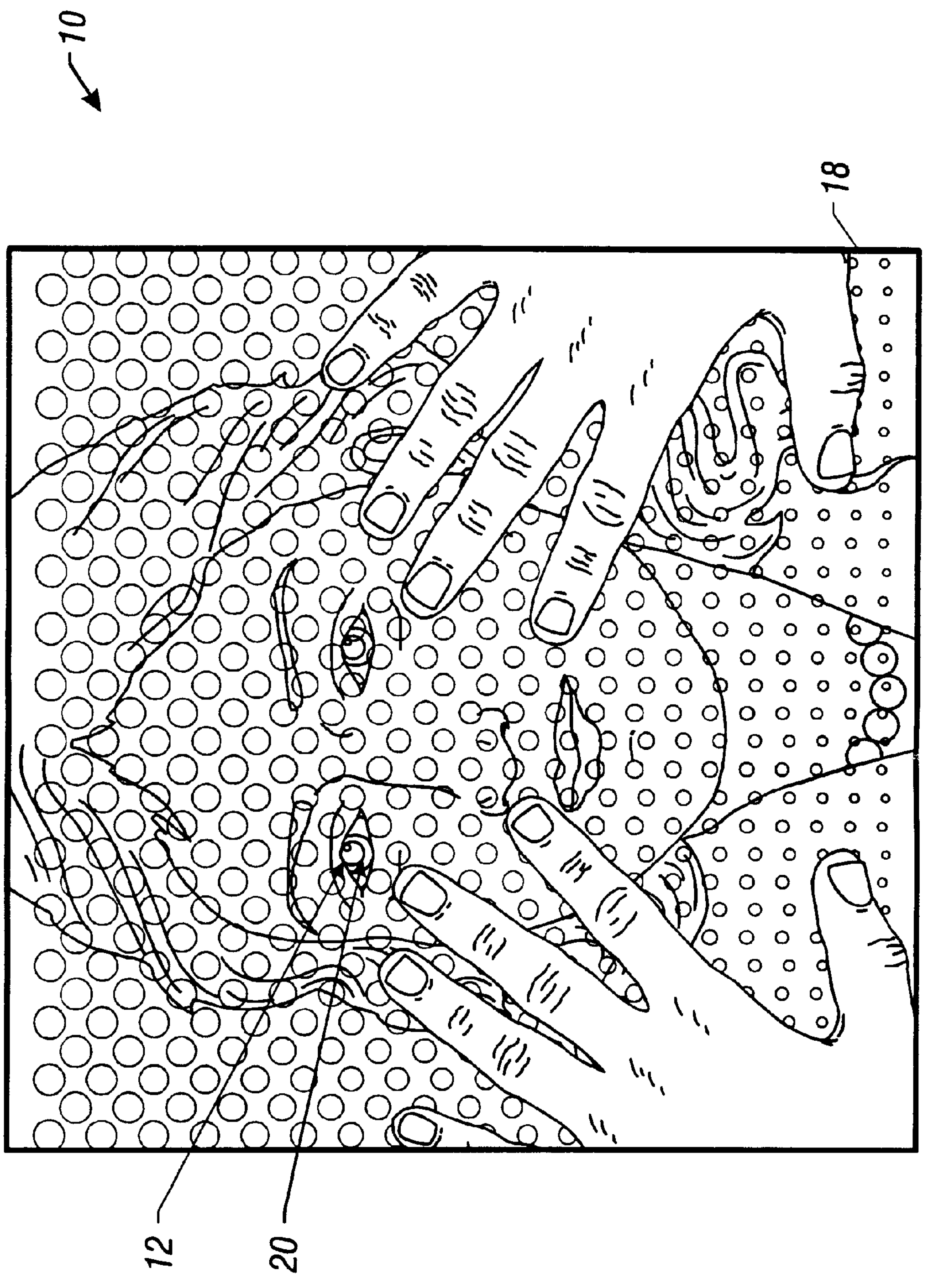
FIG. 1 shows a printed photograph and a transparent correction sheet placed thereon.
Figure 1A:
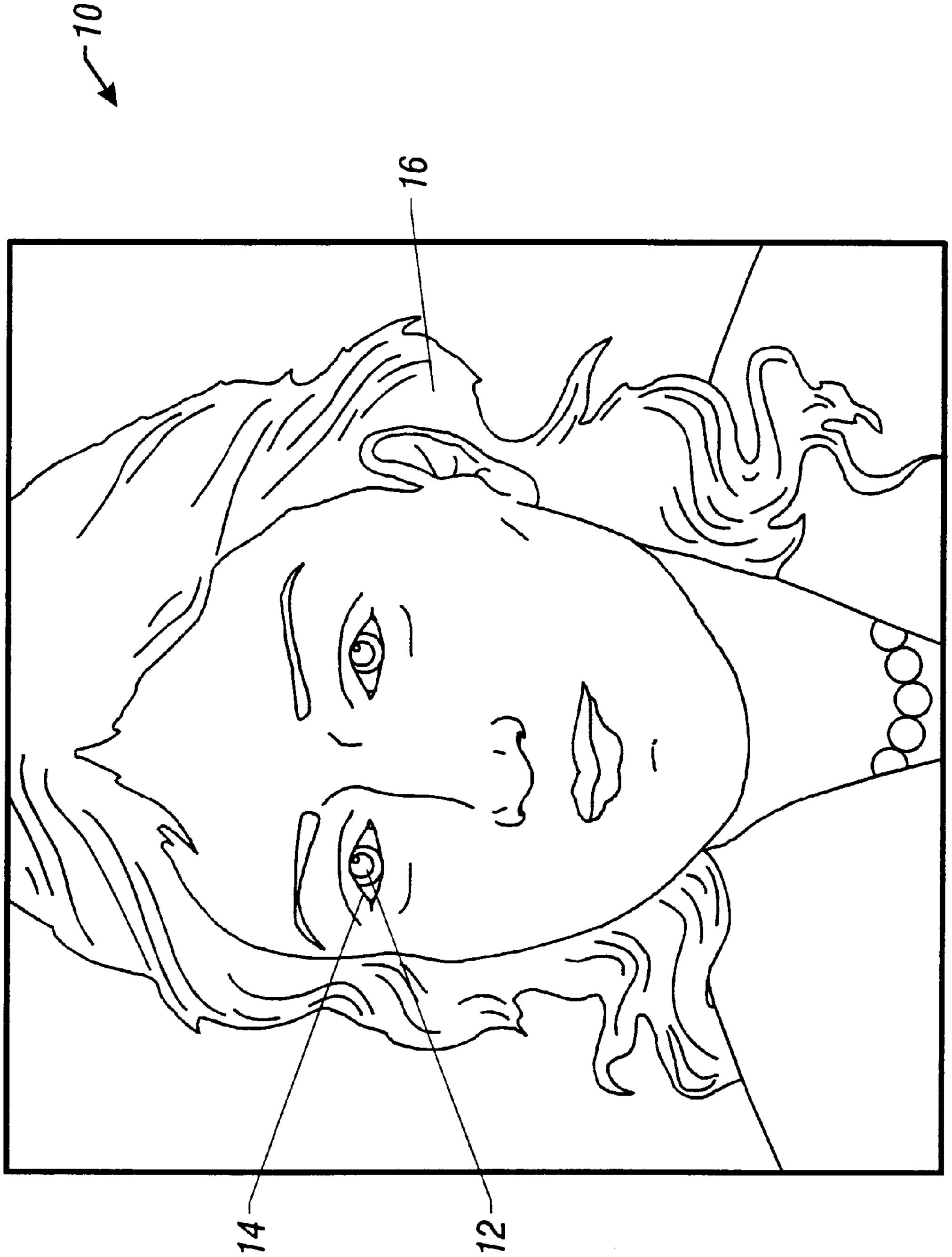
FIG. 1A shows the photograph of FIG. 1 without the correction sheet.

Referring to FIGS. 1 and 1A, to correct a red-eye affected image 12 of a pupil in an image 14 of an eye in a photograph 10 of a person 16, a person places a correction sheet 18 over photograph 10. The person then transfers rub-on material deposited on correction sheet 18 to photograph 10 to cover red-eye affected pupil image 12.

Figure 2:
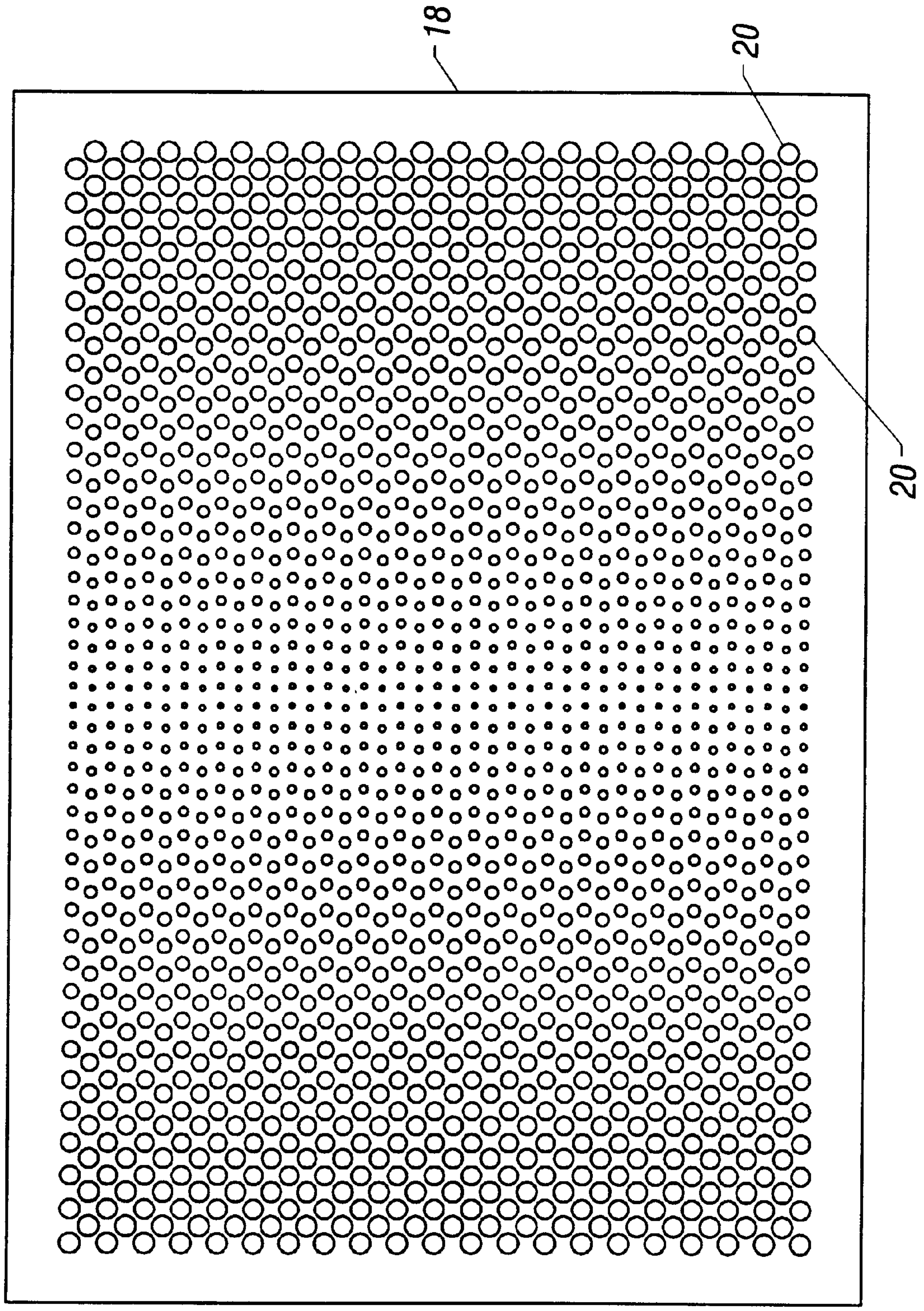
FIG. 2 shows the correction sheet of FIG. 1.

Referring to FIG. 2, the structure of correction sheet 18 will now be described. As stated, correction sheet 18 has a rub-on material deposited on one side. The rub-on material is formed into a number of shapes, here circles 20, of various sizes. The shape circle is selected because pupil and their images are substantially circular. Note that, in other embodiments, other shapes, such as elliptical shapes, may also be used.

The sizes of circles 20 are selected to adequately cover red-eye affected pupil images 12 of various sizes in printed photographs. The diameter size of circles can range, for example, from about 0.25 millimeters to about 5 millimeters, although larger and smaller dimension can also be used depending on the size of the red-eye affected pupil image 12. Preferably, the diameters of circles 20 range from about 0.5 to about 2 millimeters, which I have found to be the most suitable range of dimension for covering the most commonly appearing red-eye image dimensions in common printed photographs such as 3×5", 4×6", and 5×7" photographs.

Correction sheet 18 can be constructed out of transparent mylar or styrene material. The rub-on material can be preferably adapted for adhesion to printed photographs. Additionally, the rub-on material is preferably thin enough that it is not objectionably raised above the surface. The rub-on material can be dark or black mylar, which is deposited on correction sheet 18 by applying mylar ink onto mylar or styrene material using conventional mylar printing processes. A thin layer of glue is applied over the deposited mylar to provide adhesiveness for the deposited mylar to adhere to photograph 10. The glue is selected to leave minimal residue on photograph 10. Transparent cyan mylar can also be used as rub-on material. Because cyan is the complementary color to the color red, transparent cyan colored mylar neutralizes the color red of red-eye affected pupil images.

A method of using correction sheet 18 to correct red-eye affected pupil images will now be described in detail. Referring back to FIG. 1, as previously stated, correction sheet 18 is placed over photograph 10 such that the rub-on material is in contact with photograph 10. Correction sheet 18 is then moved over photograph 10 to align one of circles 20 with the red-eye affected pupil image 12 in photograph 10. The size of the aligned circle 20 is preferably selected to cover pupil image 12 while not significantly extending beyond the edges of pupil image 12.

Figure 3:
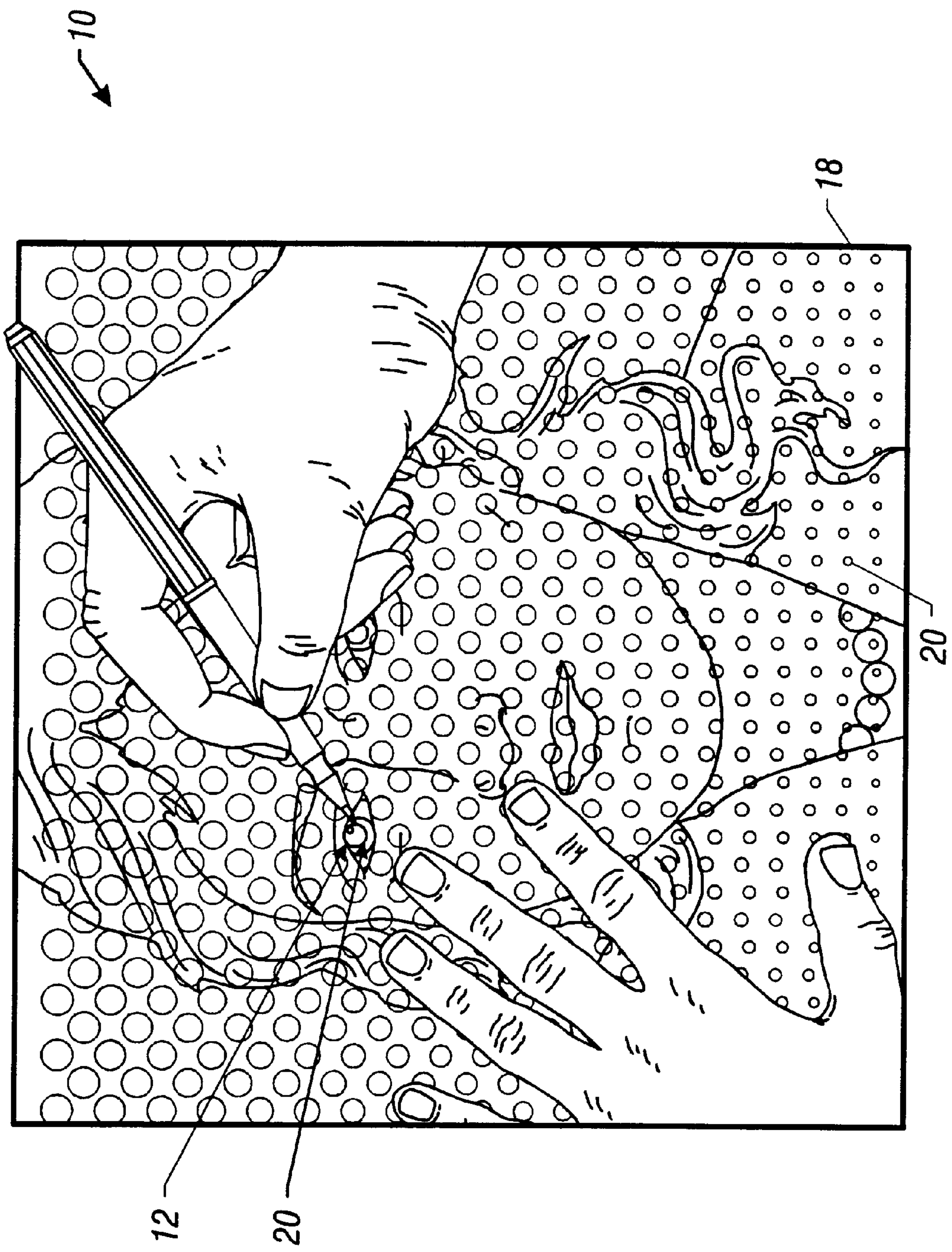
FIG. 3 shows the printed photograph and transparent correction sheet of FIG. 1 placed thereon, where pressure is being applied to the correction sheet to deposit the rub-on material onto the photograph.

Referring to FIG. 3, after aligning one of the circles 20 with pupil image 12, pressure is applied to the rub-on material through correction sheet 18, by rubbing the side of correction sheet 18 not having the rub-on material. The selected circle 20 is then deposited onto photograph 10 and adheres to photograph 10 to cover the pupil. Correction sheet 18 is then removed. Because the selected circle 20 adheres to the surface of photograph 10, it can be constructed from a material which minimally, if at all, affects printed photograph 10 or the emulsion on its paper. For example, the material may be selected to adhere to photograph 10 by electrostatic attraction and therefore minimally affect photograph 10.

Figure 4:
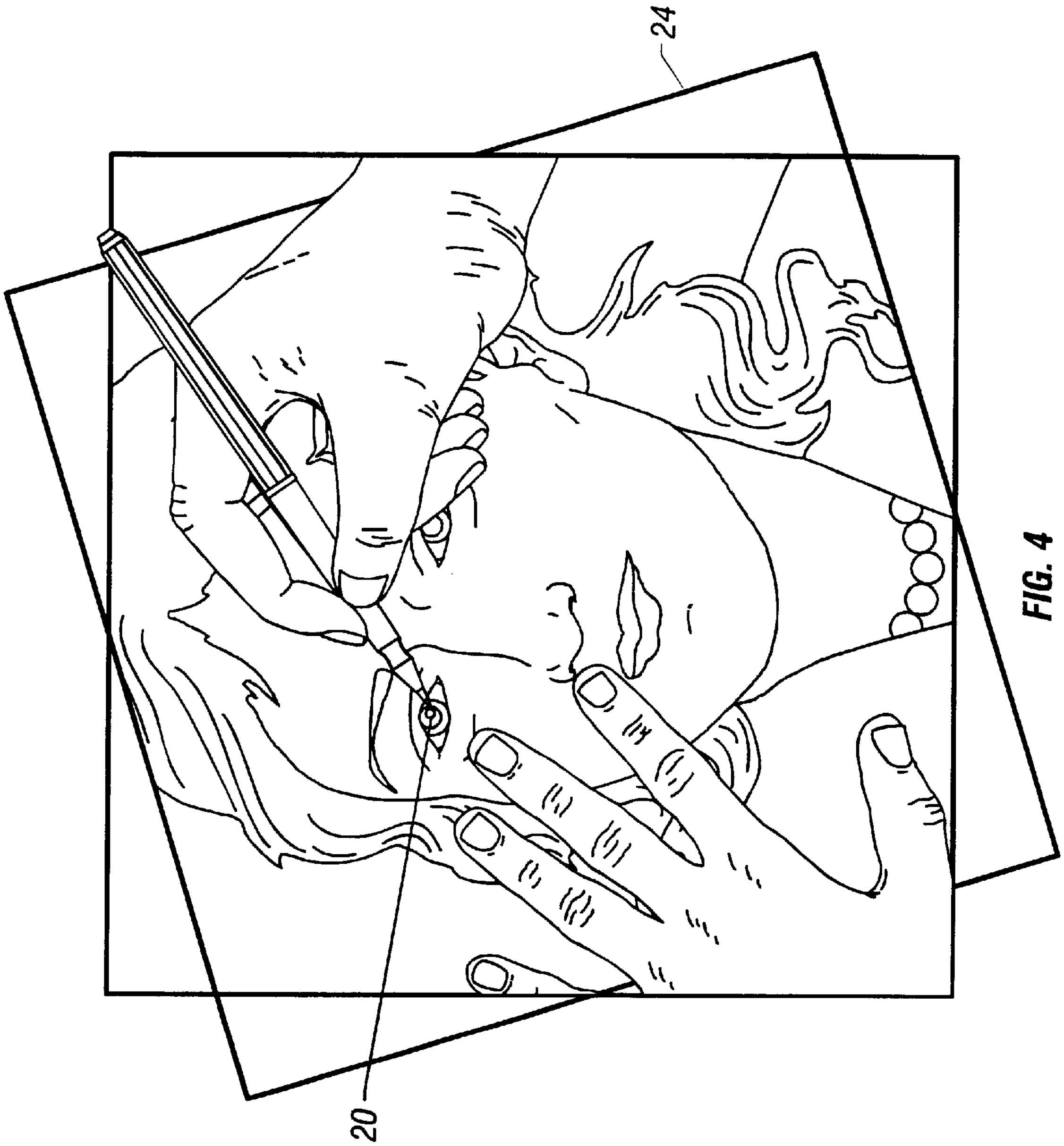
FIG. 4 shows the printed photograph of FIG. 3, where additional pressure is being applied to the deposited rub-on material.

Referring to FIG. 4, after depositing the selected circle 20 on photograph 10, another transparent or semi-transparent sheet 24 (for example, a vegetable parchment silicon coated sheet) may be placed over photograph 10 and additional pressure may be applied to further secure the adhesion of the deposited circle 20 to photograph 10. This results in smoothing any raised area and eliminating any air bubbles, between photograph 10 and the deposited circle 20.

Figure 5:
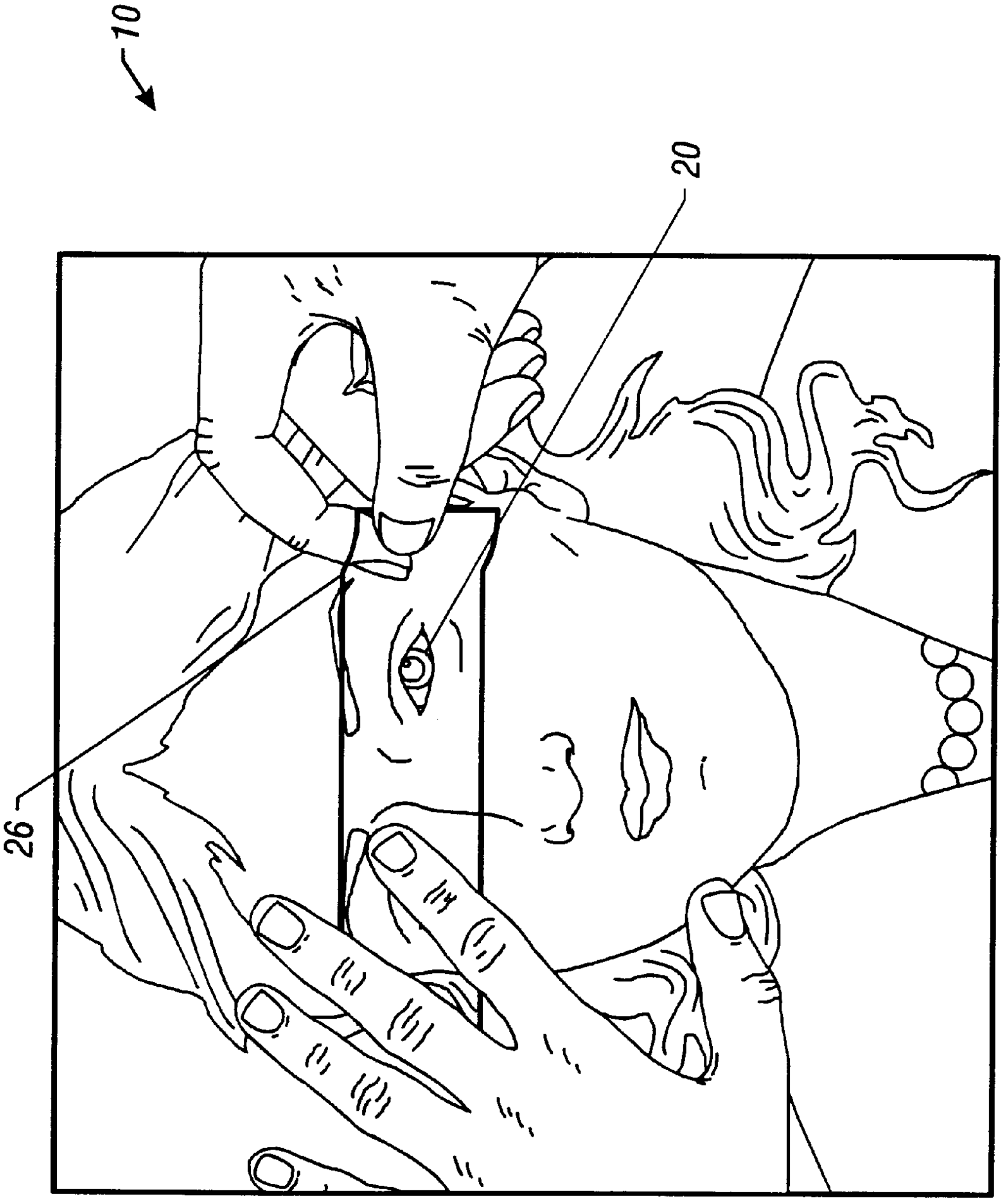
FIG. 5 shows the printed photograph of FIG. 4 where the deposited rub-on material is being removed by an adhesive tape.

In some embodiments, the rub-on material may be selected to adhere well to photograph 10 while at the same time to be easily removable from photograph 10. Mylar is one such material. In the case of removable rub-on material, the rub-on material may be removed to correct for any mistakes in depositing the material, such as misaligning the selected circle 20 with pupil image 12. Referring to FIG. 5, one technique of removing the rub-on material is to place a piece of common household adhesive tape 26, such as those available under the brand name Scotch, over the deposited circle 20 and then remove the tape to remove the deposited circle 20 from photograph 10.

It is to be understood that while the invention has been described in conjunction with the detailed description thereof, the foregoing description is intended to illustrate and not limit the scope of the invention, which is defined by the scope of the appended claims. Other aspects, advantages, and embodiments are within the scope of the following claims.

What is claimed is:

1. A sheet having a transparent rub-on material of a selected color deposited thereon for transferring the material onto a printed photograph to cover an image of a pupil in an image of an eye having red-eye effect, wherein the selected color is selected to neutralize said red-eye effect when the material covers the image of the pupil.

2. The sheet of claim 1 wherein the material is shaped as substantially a plurality of circles.

3. The sheet of claim 1 wherein the selected color is cyan.

4. The sheet of claim 3 wherein each circle has a diameter substantially within a range of about 0.25 millimeters to about 5 millimeters.

5. The sheet of claim 4 wherein the diameter of each circle is substantially within a further range of about 0.5 millimeters to about 2 millimeters.

6. A method comprising:

placing a sheet over a printed photograph, wherein the sheet has a transparent material of a selected color deposited thereon, transferring the material onto the printed photograph to cover an image of a pupil in an image of an eye having red-eye effect, wherein the selected color is selected to neutralize said red-eye effect when the material covers the image of the pupil.

7. The method of claim 6 wherein the selected color is cyan.

8. The method of claim 6 wherein the material is removable, the method further comprising:

placing an adhesive material over the transferred material to adhere to the transferred material; and removing the adhesive material, thereby removing the transferred material.

9. The method of claim 6 wherein the material is shaped and sized on said sheet to form a selected shape of a selected size for covering the pupil image.

* * * * *